United States Patent
Kang (10) Patent No.: US 10,023,062 B2
(45) Date of Patent: Jul. 17, 2018

(54) ELECTRIC VEHICLE MOBILITY MODELING AND ENERGY RESOURCES SCHEDULING

(75) Inventor: Taehyen Kang, Johns Creek, GA (US)

(73) Assignee: General Electric Company, Schenectady, NY (US)

(*) Notice: Subject to any disclaimer, the term of this patent is extended or adjusted under 35 U.S.C. 154(b) by 628 days.

(21) Appl. No.: 13/347,520

(22) Filed: Jan. 10, 2012

(65) Prior Publication Data

US 2013/0179135 A1 Jul. 11, 2013

(51) Int. Cl.
*G06G 7/48* (2006.01)
*B60L 11/18* (2006.01)

(52) U.S. Cl.
CPC ....... *B60L 11/1842* (2013.01); *B60L 11/1844* (2013.01); *B60L 2240/62* (2013.01); *B60L 2240/72* (2013.01); *Y02E 60/721* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y04S 10/126* (2013.01)

(58) Field of Classification Search
CPC ...... Y02T 90/12; Y02T 90/16; G06F 17/5095
See application file for complete search history.

(56) References Cited

U.S. PATENT DOCUMENTS

| | | | |
|---|---|---|---|
| 6,917,180 B2 | 7/2005 | Harrison et al. | |
| 7,595,607 B2 | 9/2009 | Lambert et al. | |
| 7,991,665 B2 * | 8/2011 | Hafner et al. | 705/35 |
| 2005/0040789 A1 | 2/2005 | Salasoo et al. | |
| 2008/0114499 A1 * | 5/2008 | Hakim et al. | 700/291 |
| 2008/0281479 A1 | 11/2008 | King et al. | |
| 2009/0134717 A1 * | 5/2009 | Marks | 307/149 |
| 2009/0234521 A1 * | 9/2009 | Kumar et al. | 701/19 |
| 2010/0019718 A1 * | 1/2010 | Salasoo et al. | 320/103 |
| 2010/0019726 A1 | 1/2010 | Kumar | |
| 2010/0082464 A1 * | 4/2010 | Keefe | 705/32 |
| 2010/0228415 A1 * | 9/2010 | Paul | 701/22 |
| 2011/0016063 A1 * | 1/2011 | Pollack et al. | 705/412 |
| 2011/0071932 A1 * | 3/2011 | Agassi | B60L 3/12 705/34 |

(Continued)

OTHER PUBLICATIONS

Karbassi, A., Barth, M., Vehicle Route Prediction and Time of Arrival Estimation Techniques for Improved Transportation System Management, IEEE, 2003. pp. 511-516.*

(Continued)

Primary Examiner — Brian S Cook
(74) Attorney, Agent, or Firm — Fletcher Yoder, P.C.

(57) ABSTRACT

A device includes a processor configured to execute one or more instructions stored in a memory to receive an electrical vehicle (EV) location profile having information regarding movement of an EV between a first and a second charging location of an electrical network. The processor is also configured to apply an EV mobility model to the EV location profile to determine an optimized schedule for the EV to charge or discharge a storage cell of the EV at the first or second charging locations during a scheduling period. The EV mobility model comprises constraints that describe interactions of the EV with the electrical network.

16 Claims, 3 Drawing Sheets

(56) References Cited

U.S. PATENT DOCUMENTS

2011/0202217 A1* 8/2011 Kempton ............ B60L 11/1824
          701/22
2011/0282535 A1* 11/2011 Woody et al. .................. 701/22

OTHER PUBLICATIONS

Kempton, W., Tomic, J., Vehicle-to-grid power fundamentals: Calculating capacity and net revenue, Journal of Power Sources 144 (2005) pp. 268-279.*
"Via" Collins English Dictionay—Complete & Unabridged 10$^{th}$ Edition 2009, William Collins Sons & Co. Ltd. 1979.*
Webster's New Riverside University Dictionary, Houghton Mifflin Company, 1994.*
Tomic_2007 (Using fleets of electric-drive vehicles for grid support, Journal of Power Sources 168 (2007) 459-468).*
Sortomme_2011 (Optimal Charging Strategies for Unidirectional Vehicle-to-Grid, IEEE Transaction on Smart Grid, vol. 2, No. 1, Mar. 2011).*
Karbassi, Vehicle Route Prediction and Time of Arrival Estimation Techniques for Improved Transportation System Managemnet, IEEE 2003.*
Tomic_2007, Using fleet of electric-drive vehicles for grid support, Journal of Power Sources 168 (2007) 459-468.*

* cited by examiner

ELECTRIC VEHICLE MOBILITY MODELING AND ENERGY RESOURCES SCHEDULING

BACKGROUND OF THE INVENTION

The subject matter disclosed herein relates to energy distribution, and more specifically, to modeling electric vehicles (EVs) associated with an electrical network.

Electric vehicles (EVs) are growing in popularity due to rising energy costs. Generally speaking, certain EVs are capable of connecting to an electrical network (e.g., at a charging station) in order to receive power and charge their batteries. Additionally, certain EVs are also capable of generating and storing surplus energy (e.g., via breaking or kinetic energy recovery systems) during operation. This surplus energy may be supplied by the EV to the electrical network when the EV is coupled to a charging station. For example, an EV may be charged or discharged at the home of the owner of the EV or at charging stations distributed throughout an area.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a device includes a processor configured to execute one or more instructions stored in a memory to receive an electrical vehicle (EV) location profile having information regarding movement of an EV between a first and a second charging location of an electrical network. The processor is also configured to apply an EV mobility model to the EV location profile to determine an optimized schedule for the EV to charge or discharge a storage cell of the EV at the first or second charging locations during a scheduling period. The EV mobility model comprises constraints that describe interactions of the EV with the electrical network.

In another embodiment, a method includes applying, via a processor, an electrical vehicle (EV) mobility model to a received EV location profile. The location profile includes positions of a first charging location and a second charging location of an electrical network and a travel distance and a travel time for an EV to move between the first and second charging locations. The EV mobility model includes constraints that define interactions of the EV with the electrical network. The method further includes generating, via the processor, an optimized schedule for the EV to charge or discharge a storage cell of the EV at the first or second charging locations.

In another embodiment, a charging station device has a charging interface configured to couple an electrical vehicle (EV) to an electrical network. The charging station device also includes a network interface configured to receive a schedule for the electrical network to supply power to or receive power from a storage cell of the EV when it is coupled to the charging interface. The schedule is generated by applying an EV mobility model to an EV location profile and minimizes power costs, power transmission losses, or both, in the electrical network. The charging station device further includes a processor configured to use the schedule to instruct the charging interface when to supply power to or receive power from the storage cell of the EV.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

An electric vehicle (EV) may move between a number of locations and may be capable of being either an energy consumer (e.g., as the EV is charging) or an energy producer (e.g., as the EV is discharging surplus energy) when coupled to charging stations at the different charging locations. Thus, a charging station may be a system or device which couples an EV to an electrical network in order to receive or supply power. Moreover, a distributed energy resources (DER) aggregator or power distribution company may desire to model behavior of EVs as it is coupled to different portions of the electrical network. That is, a DER aggregator may desire to model the mobility of the EV as it moves between multiple locations and behaves as a power generator or consumer at these locations. By modeling this behavior, presently disclosed techniques enable the DER aggregator to more efficiently manage the distribution of power to and from a number of EVs. For example, using the presently disclosed techniques DER aggregators may be able to reduce the distance between power generation and consumption within the electrical network and, thereby, reduce power transmission losses. Additionally, by modeling EV mobility the DER aggregator may, additionally or alternatively, optimize the charging and discharging schedule of the EV in order to minimize power demand and power costs. It should be appreciated that the terms "optimize" and "minimize" may be used to refer to any improvement or reduction of a particular parameter, respectively. That is, the present technique generates a schedule for charging and discharging the EV that is optimized (i.e., improved) by minimizing (i.e., reducing) certain parameters (e.g., power cost or power transmission losses).

Figure 1:
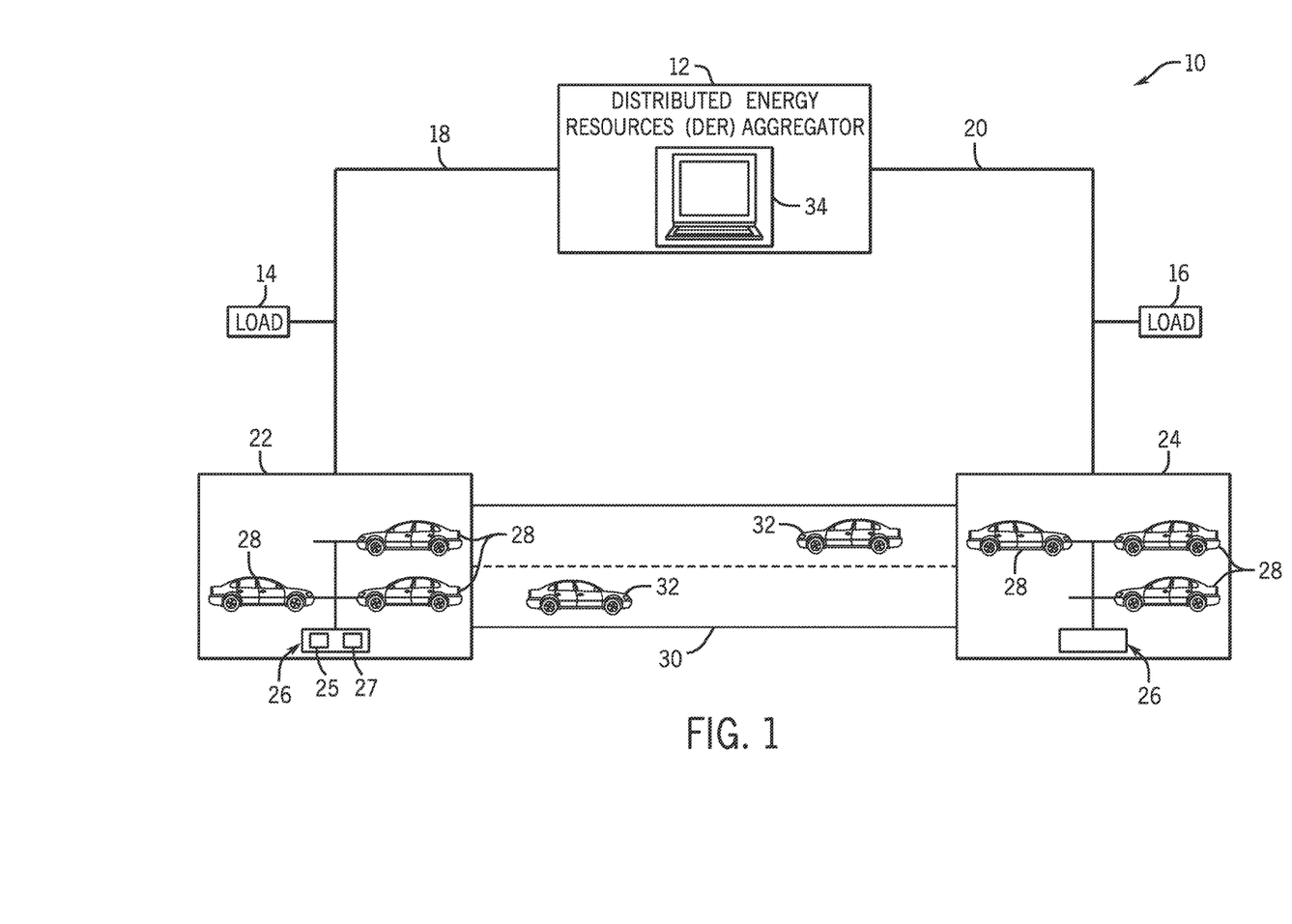
FIG. 1 is a schematic illustrating an embodiment of a distributed energy resource (DER) network.

With the foregoing in mind, FIG. 1 illustrates an embodiment of an electrical network 10 being operated by a DER aggregator 12. That is, in the illustrated electrical network 10, a DER aggregator 12 may be responsible for the production and/or distribution of power throughout the electrical network 10. The electrical network 10 may also include one or more loads (e.g., loads 14 and 16) which may represent any power consumer in the electrical network 10. That is, loads 14 and 16 may represent a home, a business, a piece of equipment. Additionally or alternatively, loads 14 and 16 may represent subcircuits of the electrical network 10 and may include any number of individual loads. The illustrated loads 14 and 16 are respectively coupled to the DER aggregator 12 via power lines 18 and 20. Additionally, the electrical network 10 includes two EV charging locations 22 and 24. The illustrated EV charging locations 22 and 24 are respectively coupled to the DER aggregator 12 via power lines 18 and 20. Furthermore, FIG. 1 also includes a road 30, which may provide a path for an uncoupled EV 32 to move between the EV charging locations 22 and 24.

The illustrated EV charging locations 22 and 24 may include a number of EV charging stations 26 that are configured to deliver power to and receive power from the energy storage cells (e.g., batteries and/or capacitors) of connected EVs 28. In certain embodiments, these charging stations 26 may include a memory 25 and a processor 27 for storing and executing one or more instructions to regulate when the charging station 26 may deliver power to and receive power from the connected EVs 28. Furthermore, in certain embodiments, the charging station 26 may additionally include one or more network interfaces (e.g., a network interface card, a modem, a wireless modem or network card) to receive from a remote system (e.g., EV mobility modeler 34) one or more instructions for charging and discharging connected EVs 28 at particular times (e.g., a schedule for charging and discharging the EVs 28 coupled to the charging station 26).

Additionally, the illustrated electrical network 10 includes EV mobility modeler 34 that may be used to determine how resources may be distributed within the electrical network 10 by the DER aggregator 12. In certain embodiments, the EV mobility modeler 34 may be computer (e.g., a server computer, desktop computer, laptop computer, tablet computer, smart phone, or the like) including a number of internal components, which are discussed in detail below with respect to FIG. 2. As discussed below, the EV mobility modeler 34 may receive information regarding an EV in the form of EV location profile and apply an EV mobility model in order to determine an optimized schedule for charging and discharging the EV at different locations in the electrical network 10 (e.g., location 22 or location 24). That is, the EV mobility modeler 34 is generally responsible for modeling the mobility of one or more EVs that are, at times, coupled to electrical network 10 (e.g., at location 22 or location 24) to either consume or produce power at the location. Additionally, the EV mobility modeler 34 may also access and/or store additional information regarding the electrical network 10 (e.g., power output from DER aggregator 12, values for the magnitude of loads 14 and 16, the resistance of power transmission lines 18 and 20, a base power consumption of the locations 22 and 24, and the like).

Figure 2:
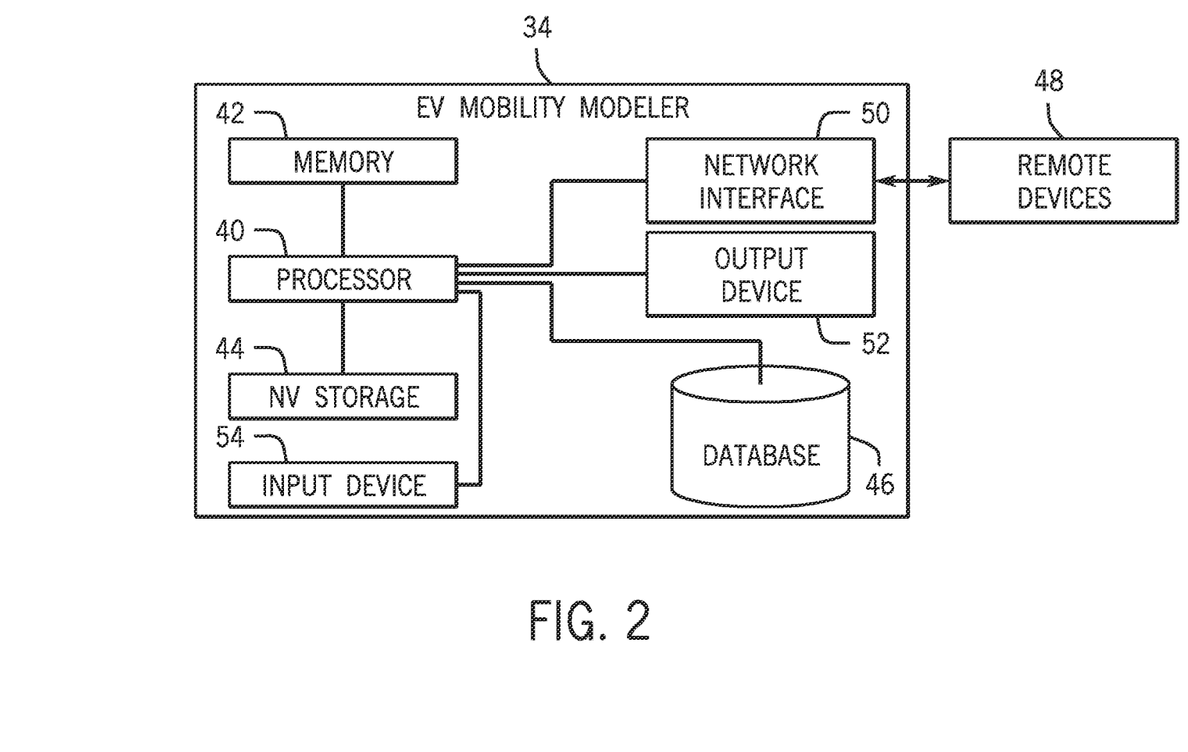
FIG. 2 is a schematic illustrating components of an embodiment of an electric vehicle (EV) mobility modeler device illustrated in FIG. 1.

Turning to FIG. 2, an embodiment of the EV mobility modeler 34 is illustrated. More specifically, FIG. 2 illustrates a number of internal components which may be present in an embodiment of the EV mobility modeler 34. For example, illustrated EV mobility modeler 34 includes a processor 40 (e.g., a central processing unit (CPU) or similar processor), memory 42 (e.g., random access memory (RAM)), and nonvolatile (NV) storage 44 (e.g., a hard drive, solid-state disk, flash drive, or the like). Generally speaking, the processor 40 may control the operation of the EV mobility modeler 34 by executing instructions stored in the non-transitory memory 42 and/or NV storage 44. Additionally, memory 42 and/or NV storage 44 may be used to store the various constraints of the EV mobility model discussed in detail below. Furthermore, the EV mobility modeler 34 may include a database 46 which may be used to store the EV location profiles for various EVs (e.g., EVs 28 and 32). In certain embodiments, the model database 46 may be implemented as a database that is stored in memory 42 and/or NV storage 44. Additionally, in certain embodiments, the database 46 may be populated with EV location profile data that has been supplied from one or more remote devices 48 (e.g., a remote server, an EV operator's home computer, or the EVs). In such embodiments, the EV mobility modeler 34 may include a network interface 50 (e.g., a network interface card (NIC), modem, wireless network card, or any other communication interface) to allow the EV mobility modeler 34 to receive the EV location profile data from these remote devices 48. Also, the EV mobility modeler 34 may include an output device 52 (e.g., a monitor, flat-panel display, printer, or similar output device) that may be used to display the optimized schedule for charging and discharging the EVs (e.g., EVs 28 and 32) when the EVs are disposed at, for example, locations 22 and/or 24. Furthermore, the EV mobility modeler 34 may also include an input device (e.g., keyboard, mouse, touchpad, touch screen, or similar input device) for entering information (e.g., EV location profile data) into the EV mobility modeler 34.

Figure 3:
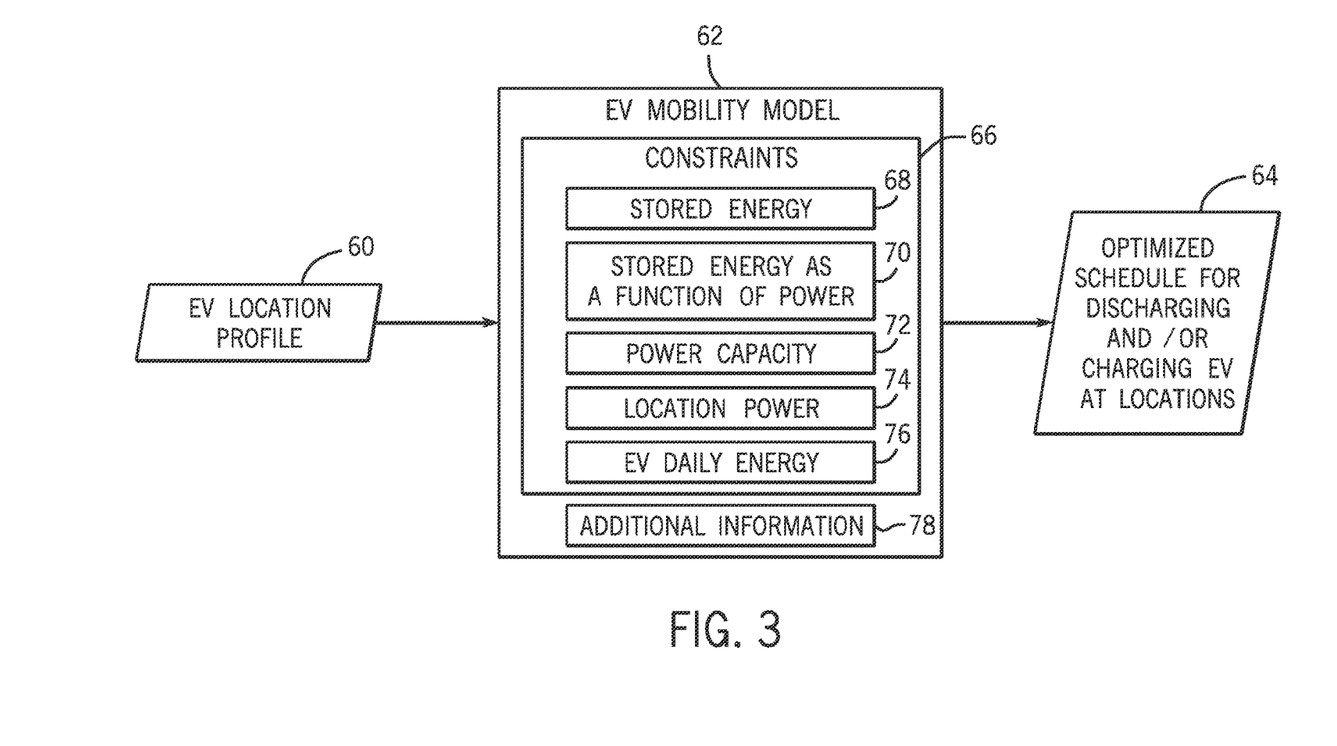
FIG. 3 is a flow diagram illustrating an embodiment of a process by which electric vehicle (EV) location profile data is processed by the EV mobility modeler of FIG. 2 to generate an optimized schedule for charging and discharging the EV.

Turning now to FIG. 3, the EV mobility modeler 34 generally receives EV location profile data 60 and then applies an EV mobility model 62 to the received data to produce an optimized schedule 34 for charging and discharging the EV. More specifically, the EV mobility modeler 34 may receive an EV location profile 60 for an EV from a remote device 48 via the network interface 50. Generally speaking, the EV location profile 60 may include a set of parameters that are defined by the operator of the EV. For example, an EV location profile 60 may include the position of charging locations (e.g., locations 22 and 24) frequented by the EV, the distance amount between these charging locations, and the time typically required for the EV to travel between these charging locations. In certain embodiments, an EV operator may use a device (e.g., a home computer, laptop computer, tablet computer, smart phone, or similar computing device) to provide the EV location profile 60 directly to the EV mobility modeler 34 or to a Web server that may be communicatively coupled to the EV mobility modeler 34 (e.g., via the network interface 50). Once the EV mobility modeler 34 has received an EV location profile 60, the EV mobility modeler 34 may store the EV location profile in memory 42, NV storage 44, and/or database 46 for further processing.

Furthermore, in certain embodiments, certain EVs may include a device configured to determine and store the position and/or movement of the EV at various times. In such embodiments, the EV may be equipped with memory and one or more location tracking or monitoring systems (e.g., global positioning system (GPS), cell tower triangulation systems, or similar location tracking systems) to acquire and store the movements of the EV. In certain embodiments, a computer of the EV may also include one or more processors configured to process the location data to determine various parameters for the EV location profile 60, while in other embodiments, the EV may deliver the raw location data to the EV mobility modeler 34 and have the EV mobility modeler 34 determine the EV location profile 60 from the raw location data. Furthermore, in such embodiments, the EV may be equipped with wireless communication (e.g., a wireless modem or network card) to allow the EV to communicate with the EV mobility modeler 34 (e.g., via network interface 50). In other embodiments, the EV may communicate with the EV mobility modeler 34 via a wired data connection when the EV is coupled to a charging station 26 at a charging location (e.g., location 22 or 24).

Once the EV mobility modeler 34 has received the EV location profile 60, the EV mobility modeler 34 may apply the EV mobility model 62 to the received EV location profile 60 in order to determine an optimized schedule for charging and discharging the EV 64. Generally speaking, an EV mobility model 62 is a scheduling optimization model that includes a number of constraints 66 that define the limitations of the system 10. As discussed in detail below, some of the constraints represent physical limitations of the EVs (e.g., EVs 28 or 32) and the charging stations 26, while other constraints may represent parameters defined by the EV operator. Mathematically, the constraints that define the EV mobility model 62 may be represented as a series of equations and inequalities, as discussed in detail below. Additionally, it should be noted that while the discussion below is directed toward an example of an EV mobility model 62 for a single EV with two charging locations (e.g., locations 22 and 24), in other embodiments, any number of EVs and charging locations may be included in the EV mobility model 62. For example, as EVs and EV charging locations become more common, the presently disclosed EV mobility model 62 may be expanded to include tens, hundreds, or more of EVs and charging locations distributed throughout the electrical network 10.

The EV constraints 66 of the EV mobility model 62 may include a stored energy constraint 68. The stored energy constraint 68 may define the amount of energy stored by an EV at any point in time to be greater than or equal to a minimum stored energy limit EV and to be less than or equal to a maximum stored energy limit of the EV. In other words, the amount of energy stored by an EV will be in a defined range between certain maximum and minimum stored energy values. In certain embodiments, the stored energy constraint 68 for a particular EV, i, may be defined by the following inequality:

$$E_i^{mn} \leq E_i(t) \leq E_i^{mx} \qquad \text{Eq. 1}$$

where $E_i(t)$ is a stored energy of the EV at a time, t, and $E_i^{mn}$ is a minimum stored energy of the EV, and $E_i^{mx}$ is a maximum stored energy of the EV.

Additionally, the EV constraints 66 of the EV mobility model 62 may also include a stored energy constraint as a function of power 70 injected or consumed by an EV. That is, the amount of energy stored by an EV at any point in time may depend on a previous amount of stored energy, a charging or discharging efficiency of the EV, the power injection or consumption of the EV, and a time interval for which the EV is charging or discharging. In certain embodiments, the stored energy constraint as a function of injected or consumed power 70 for an EV may be defined by the following equations:

$$E_i(t) = \begin{cases} E_i(t-1) - Z_i^d x_i(t) T, & \text{if } x_i(t) > 0 \\ E_i(t-1) - Z_i^c x_i(t) T, & \text{if } x_i(t) < 0 \end{cases} \qquad \text{Eq. 2}$$

where $E_i(t-1)$ is a stored energy of the EV at a previous time, $Z_i^d$ is a discharging efficiency of the EV, $Z_i^c$ is a charging efficiency of the EV, $x_i(t)$ is a power injection or consumption of the EV at the time, t, and T is a time interval for the power injection or consumption by the EV at a charging station 26. When $x_i(t)>0$ the EV is discharging and injecting power into the electrical network 10, and when $x_i(t)<0$ the EV is charging and consuming power from the electrical network.

Furthermore, the EV constraints 66 of the EV mobility model 62 may also include a power capacity constraint 72. Similar to the first stored energy constraint 68, the power capacity constraint 72 may define the power injection or consumption of an EV to be greater than or equal to a minimum power injection or consumption limit of the EV, and may further define this EV power injection or consumption to be less than or equal to a maximum power injection or consumption limit of the EV. In certain embodiments, the power capacity constraint 72 of an EV may be defined by the following inequalities:

$$x_i^{c,mn} \leq x_i(t) \leq x_i^{c,mx}$$

$$x_i^{d,mn} \leq x_i(t) \leq x_i^{d,mx} \qquad \text{Eq. 3}$$

wherein $x_i^{c,mn}$ is a minimum power consumption limit of the EV, $x_i^{c,mx}$ is a maximum power consumption limit of the EV, $x_i^{d,mn}$ is a minimum power injection limit of the EV, $x_i^{c,mx}$ is a maximum power injection limit of the EV.

Also, the EV constraints 66 of the EV mobility model 62 may also include an EV daily energy constraint 76. The EV daily energy constraint 76 may define an amount of stored energy of the EV at the end of a scheduling period to be based on an initial stored energy of the EV and the sum of all power injections or consumptions over their respective time intervals throughout the course of the scheduling period. The term "scheduling period" as used herein refers to a length of time for which the charging and discharging of an EV may be scheduled at one or more charging locations. In certain embodiments, a scheduling period may be a 24 hour day, while in other embodiments a scheduling period may be any amount of time (e.g., 1 hour, 6 hours, 12 hours, etc.).

In certain embodiments, the value for the amount of stored energy of the EV at the end of the scheduling period may be supplied by the EV operator. For example, the EV operator may (e.g., via computer interface or via an interface of the EV) provide a value for the amount of energy that the operator desires to have stored in the EV at the end of the scheduling period. That is, when an EV operator disposes the EV at a charging location for a period of time, the EV operator may indicate that a desired amount of energy to be stored in the EV at the end of this period of time (e.g., to have sufficient energy to reach the final destination of the operator). In certain embodiments, the EV daily energy constraint 76 may be defined by the following equation:

$$E_i(t_0) - \sum_t x_i(t)T = E_i^d, \qquad \text{Eq. 4}$$

where $E_i(t_0)$ is an initial stored energy of the EV at an initial time, $t_0$, and $E_i^d$ is a stored energy of the EV at an end of a scheduling period. Furthermore, in certain embodiments, $E_i^d$ may be set to $E_i^{mx}$ (i.e., the EV operator may desire the EV to be fully charged at the end of the scheduling period). Additionally, in certain embodiments, the EV may automatically determine a value for $E_i^d$ based on analyzed driving patterns of the EV operator.

Generally speaking, the aforementioned constraints define the limitations of the EV in terms of energy and power. Additionally, these constraints may be modified and additional constraints may be added to address the mobility of the EV between charging locations (e.g., locations 22 and 24). Accordingly, Eq. 2 may be modified to include a term, $E^{dr}$, which is the amount of energy consumed to move the EV between locations 22 and 24. As such, in certain embodiments, the stored energy constraint as a function of power 70 for an EV may be defined by the following equations:

$$E_i(t) = \begin{cases} E_i(t-1) - Z_i^d x_i(t)T - E_i^{dr}, & \text{if } x_i(t) > 0 \\ E_i(t-1) - Z_i^c x_i(t)T - E_i^{dr}, & \text{if } x_i(t) < 0 \end{cases} \qquad \text{Eq. 5}$$

Additionally, the EV constraints 66 of the EV mobility model 62 may also include a location power constraint 74. The location power constraint 74 defines the power injection or consumption of an EV at a particular charging location (e.g., location 22 or 24) as zero when the EV is not located at that particular charging location. That is, for example, when an EV 28 is disposed at location 22, the EV 28 does not inject or consume power at location 24. In certain embodiments, the location power constraint 74 the EV may be defined by the following equations:

$$x_i(t)=0, \text{ if } t \notin \mathcal{T}_i$$

$$x_j(t)=0, \text{ if } t \notin \mathcal{T}_j \qquad \text{Eq. 6,}$$

where $x_i(t)$ is the power injected or consumed by the EV at a first location (e.g., location 22), $\mathcal{T}_i$ is a set of time intervals when the EV is disposed at the first charging location (e.g., location 22), $x_j(t)$ is the power injected or consumed by the EV at a second location (e.g., location 24), and $\mathcal{T}_j$ is a set of time intervals when the EV is disposed at the second charging location (e.g., location 24).

Accordingly, the EV daily energy constraint 76 may also be modified to include the various power injection and consumption activities of an EV over multiple charging locations (e.g., location 22 and 24) over the course of the scheduling period (e.g., 1 day). As such, the stored energy of the EV at an end of a scheduling period $E_i^d$, may depend on an initial stored energy of the EV, $E_i(t_0)$, as well as all of the various power injection and consumption activities of the EV when coupled to charging stations 26 at the multiple charging locations (e.g., locations 22 and 24). As such, in certain embodiments, the EV daily energy constraint 76 may be defined by the following equation:

$$E_i(t_0) - \sum_t (x_i(t)T + x_j(t)T) - \beth E_i^{dr} = E_i^d, \qquad \text{Eq. 7}$$

where $\beth$ is the number of EV location changes during the scheduling period. Furthermore, in certain embodiments, $E_i^d$ may be set to $E_i^{mx}$ (i.e., the EV operator may desire the EV to be fully charged at the end of the scheduling period).

As such, the EV mobility modeler 34 may apply an EV mobility model 62, including the constraints described above, to the EV location profile 60 in order to determine the optimized schedule 64 for charging and discharging the EV. Generally speaking, the optimized schedule 64 is a schedule for charging and discharging the EV which minimizes cost (e.g., power costs) and/or losses (e.g., power losses due to power transmission). For example, the optimized schedule 64 may be optimized to minimize the cost of power when charging and discharging the EV (e.g., EV 28). As such, in addition to the constraints of the EV described above, the EV mobility model 62 may consider the cost of power throughout the scheduling period. Accordingly, when an EV (e.g., EV 28) is going to charge during a portion of the scheduling period, the portion of the scheduling period may be selected when power is the cheapest.

By further example, the EV mobility model 62 may consider the trends for power demand near the location (e.g., location 22 or 24) of the EV (e.g., EV 28) in order to minimize power losses due to transmission. That is, when an EV (e.g., 28) is going to discharge during a portion of the scheduling period, the portion of the scheduling period may be selected such that the EV is discharge when the demand for power is the greatest at or near the charging location (e.g., location 22 or 24). For example, if an EV (e.g., EV 28) is coupled to a charging station 26 at location 24, then the EV mobility model 62 may consider the trends for power demand at location 24 and nearby load 16 to determine the optimal time to discharge the EV. Since the source of the power (i.e., the discharging EV at location 24) is closer to the location of the power consumption (i.e., another EV that is charging at location 24 or a nearby load 16) the power losses during power transmission are generally lower than the losses if the power were supplied by the DER aggregator 12.

Through the use of the disclosed EV mobility modeler 12, better management of distributed energy resources, reduced power expenditures, and reduced power losses may be achievable. That is, the EV mobility modeler 12 may be used to optimize (i.e., improve) the charging and discharging schedule of the EV in order to minimize (i.e., reduce) power demand, power costs, or power transmission losses in an electrical network 10. Using this EV mobility model 62, EV discharging and charging states can be fully studied and scheduled according to the anticipated location changes, resulting in better energy resource management.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A distributed energy resource aggregator system, comprising:

an electrical vehicle (EV) comprising a storage cell; and an EV mobility modeler comprising a mobility modeler processor configured to execute one or more instructions stored in a memory that when executed by the mobility modeler processor cause the EV mobility modeler to:

receive an EV location profile comprising information regarding anticipated movement of the EV between a first and a second charging location of an electrical network during a scheduling period, the scheduling period defined by an amount of time during which various power injection and consumption activities of the EV at multiple charging locations is anticipated to occur and wherein at an end of the scheduling period a predetermined amount of stored energy is required to exist in the storage cell of the EV;

apply an EV mobility model of the EV defining the predetermined amount of stored energy required to exist in the storage cell of the EV at the end of the scheduling period to the received EV location profile by reducing distance between power generation and consumption within the electrical network in determining an optimized schedule of whether an EV will increase or decrease stored energy in the storage cell of the EV at the first charging location during the scheduling period and whether the EV will increase or decrease the stored energy in the storage cell of the EV at the second charging location during the scheduling period to contribute to the predetermined final amount of stored energy in the storage cell of the EV at the end of the scheduling period, wherein the predetermined amount of stored energy in the storage cell of the EV is an initial amount of stored energy in the storage cell of the EV at a start of the scheduling period and a sum of all power injections and consumptions throughout the scheduling period and the optimized schedule minimizes at least one of power costs and power transmission losses throughout the scheduling period; and transmit the optimized schedule to a first charging station device at the first charging location and a second charging station device at the second charging location, wherein the EV is physically coupled to the first charging station device at the first charging location at a first time of the scheduling period, the first charging station device controls alteration of the stored energy in the storage cell of the EV according to the optimized schedule transmitted to the first charging station device ensuring the predetermined amount of stored energy is in the storage cell at the end of the scheduling period, wherein the EV is physically coupled to the second charging station device at the second charging location at a second time of the scheduling period, the second charging station device controls alteration of the stored energy in the storage cell of the EV according to the optimized schedule transmitted to the second charging station device ensuring the predetermined amount of stored energy is in the storage cell at the end of the scheduling period.

2. The distributed energy resource aggregator system of claim 1, wherein the EV mobility model comprises constraints that describe interactions of the EV with the electrical network, wherein the constraints comprise at least one of a stored energy constraint, a power capacity constraint, a location power constraint.

3. The distributed energy resource aggregator system of claim 2, wherein the stored energy constraint defines a minimum energy storage limit and a maximum energy storage limit of the EV, and wherein the power capacity constraint defines a minimum power injection or consumption limit and a maximum power injection or consumption limit of the EV.

4. The distributed energy resource aggregator system of claim 2, wherein the stored energy constraint defines at least one of a stored energy of the EV using a previous stored energy of the EV, a charging or discharging efficiency of the EV, a time interval for charging or discharging the EV, an amount of energy consumed in moving the EV the between the first and second charging locations.

5. The distributed energy resource aggregator system of claim 2, wherein the location power constraint is defined such that the EV can charge or discharge the storage cell of the EV at the first charging location only when the EV is physically located at the first location, and the EV can charge or discharge the storage cell of the EV at the second location only when the EV is physically located at the second charging location.

6. The distributed energy resource aggregator system of claim 1, wherein the predetermined amount of stored energy in the storage cell of the EV is based, at least in part, on a value provided by an operator of the EV.

7. The distributed energy resource aggregator system of claim 1, wherein the device comprises a network interface configured to receive the EV location profile from at least one of a second processor, from the EV.

8. The distributed energy resource aggregator system of claim 1, wherein the EV location profile comprises a position for the first and second charging locations, a distance between the first and second charging locations, a travel time between the first and second charging locations for the EV, global positioning system (GPS) data correlating to the movement of the EV between the first and second charging locations, or any combination thereof.

9. The distributed energy resource aggregator system of claim 1, where the optimized schedule comprises a schedule for the EV to receive or provide power at the first or second charging locations that minimizes power costs based, at least in part, on a cost of power at a time of day.

10. A distributed energy resource aggregating method for an electrical network, comprising:

receiving, at a computer processor of an electric vehicle (EV) mobility modeler computer system residing in a distributed energy resources aggregator, an EV mobility model comprising constraints that define interactions of an EV with an electrical network, the constraints comprising a scheduling period, the scheduling period defined by an amount of time during which various power injection and consumption activities of the EV at multiple charging locations is anticipated to occur and at an end of the scheduling period a predetermined amount of stored energy is required to exist in a storage cell of the EV;

receiving, at the computer processor, an EV location profile, the EV location profile comprising information regarding anticipated movement of the EV between a first and a second charging location of the electrical network during the scheduling period, the information regarding anticipated movement of the EV between the first and the second charging location comprising positions of the first charging location and the second charging location of the electrical network, a travel distance, and a travel time for the EV to move between the first and the second charging locations;

applying the received EV mobility model of the EV defining the predetermined amount of stored energy required to exist in the storage cell of the EV at the end of the scheduling period to the received EV location profile;

generating, via the computer processor disposed external to the EV, and by reducing distance between power generation and consumption within the electrical network, an optimized schedule of whether the EV will increase or decrease stored energy in a storage cell of the EV at the first charging location during a scheduling period and whether the EV a will increase or decrease the stored energy in the storage cell of the EV at the second charging location during the scheduling period to contribute to the predetermined amount of stored energy in the storage cell of the EV at the end of the scheduling period, wherein the predetermined amount of stored energy in the storage cell of the EV is an initial amount of stored energy in the storage cell of the EV at a start of the scheduling period and a sum of all power injections and consumptions throughout the scheduling period and the optimized schedule minimizes at least one of power costs and power transmission losses throughout the scheduling period; and transmitting the optimized schedule to a first charging station device at the first charging location and a second charging station device at the second charging location, wherein the EV is physically coupled to the first charging station device at the first charging location at a first time of the scheduling period, the first charging station device controls alteration of the stored energy in the storage cell of the EV according to the optimized schedule transmitted to the first charging station device ensuring the predetermined amount of stored energy is in the storage cell at the end of the scheduling period, wherein the EV is physically coupled to the second charging station device at the second charging location at a second time of the scheduling period, the second charging station device controls alteration of the stored energy in the storage cell of the EV according to the optimized schedule transmitted to the second charging station device ensuring the predetermined amount of stored energy is in the storage cell at the end of the scheduling period.

11. The distributed energy resource aggregating method for an electrical network of claim 10, wherein the constraints comprise a stored energy constraint that defines a minimum energy storage limit of the EV and a maximum energy storage limit of the EV and a power capacity limit constraint that defines a minimum power injection or consumption limit and a maximum power injection or consumption limit of the EV.

12. The distributed energy resource aggregating method for an electrical network of claim 10, wherein the constraints comprise at least one of a stored energy constraint defining a stored energy of the EV based, at least in part, on a previous stored energy of the EV, a charging or discharging efficiency of the EV, a time interval for either charging or discharging the EV.

13. The distributed energy resource aggregating method for an electrical network of claim 10, comprising transmitting the optimized schedule to a remote system for use when scheduling the charging or discharging of the storage cell of the EV.

14. A charging station device located at one of a first charging location or a second charging location of the electrical network, comprising:

a charging interface that physically couples a storage cell an electrical vehicle (EV) to an electrical grid via the charging station device at one of the first charging location or the second charging location and that facilitates power to pass between the storage cell of the EV and the electrical grid via the charging station device, wherein the charging station device is co-located with the EV at one of the first charging location or the second charging location and wherein the charging device is external to the EV;

a network interface that receives instructions for the charging station device to either supply power to or receive power from the storage cell of the EV when it is coupled to the charging interface, wherein the instructions are generated based on an output from an EV mobility modeler external to the charging station device comprising a mobility modeler processor configured to executing one or more instructions stored in a memory that when executed by the mobility modeler processor cause the EV mobility modeler to:

receive an EV location profile comprising information regarding anticipated movement of the EV between the first and the second charging location of the electrical network during a scheduling period, the scheduling period defined by an amount of time during which various power injection and consumption activities of the EV at multiple charging locations is anticipated to occur and at an end of the scheduling period a predetermined amount of stored energy is required to exist in the storage cell of the EV; and applying an EV mobility model of the EV defining the predetermined amount of stored energy required to exist in the storage cell of the EV at the end of the scheduling period to the received EV location profile and by reducing distance between power generation and consumption within the electrical network, determining an optimized schedule of whether the EV will increase or decrease stored energy in the storage cell of the EV when coupled to the charging station device and contributing to the predetermined amount of stored energy in the storage cell of the EV at the end of a scheduling period, wherein the predetermined final amount of stored energy is an initial amount of stored energy of the storage cell of the EV at a start of the scheduling period and a sum of all power injections and consumptions throughout the scheduling period, and wherein the optimized schedule minimizes at least one of power costs and power transmission losses throughout the scheduling period; and a processor that uses the instructions to instruct the charging interface when to supply power to or receive power from the storage cell of the EV during a power transfer between the storage cell of the EV and the electrical grid in accordance with the optimized schedule controlling charging and discharging of the storage cell of the EV at the charging station during the scheduling period ensuring the predetermined final amount of stored energy in the storage cell of the EV at the end of the scheduling period.

15. The charging station device of claim 14, wherein the EV location profile comprises at least one of positions of a plurality of charging locations, distances between the plurality of charging locations, travel times of the EV between the plurality of charging locations, global positioning system (GPS) data correlating to the movement of the EV between the plurality of charging locations.

16. The charging station device of claim 14, wherein the EV mobility model comprises at least one of constraints that describe interactions of the EV with the electrical grid, wherein the constraints comprise a stored energy constraint, an EV daily energy constraint, a power capacity constraint, a location power constraint.

* * * * *